United States Patent
Lennert et al.

(10) Patent No.: US 10,024,986 B2
(45) Date of Patent: Jul. 17, 2018

(54) NEUTRON DETECTOR UNIT AND NEUTRON DETECTOR ARRANGEMENT

(71) Applicants: Forschungszentrum Juelich GmbH, Juelich (DE); CDT Cascade Detector Technologies GmbH, Heidelberg (DE); Ruprecht-Karls-Univetsitaet Heidelberg, Heidelberg (DE)

(72) Inventors: Peter Lennert, Heppenheim (DE); Martin Klein, Mannheim (DE); Christian J. Schmidt, Schriesheim (DE); Werner Schweika, Juelich (DE)

(73) Assignees: Forschungszentrum Juelich GmbH (DE); CDT Cascade Detector Technologies GmbH (DE); Ruprecht-Karls-Universitaet Heidelberg (DE)

( * ) Notice: Subject to any disclaimer, the term of this patent is extended or adjusted under 35 U.S.C. 154(b) by 0 days.

(21) Appl. No.: 14/392,032

(22) PCT Filed: Sep. 13, 2013

(86) PCT No.: PCT/DE2013/100326
§ 371 (c)(1),
(2) Date: Mar. 18, 2015

(87) PCT Pub. No.: WO2014/044250
PCT Pub. Date: Mar. 27, 2014

(65) Prior Publication Data
US 2015/0301203 A1    Oct. 22, 2015

(30) Foreign Application Priority Data
Sep. 18, 2012  (DE) .................. 10 2012 108 766

(51) Int. Cl.
*H01J 47/00* (2006.01)
*G01T 3/00* (2006.01)
(Continued)

(52) U.S. Cl.
CPC ............... *G01T 3/008* (2013.01); *G01T 3/08* (2013.01); *H01J 47/1266* (2013.01); *H01J 47/1294* (2013.01)

(58) Field of Classification Search
CPC ......... G01T 1/18; G01T 1/2935; G01T 1/185; G01T 3/008; G01T 3/08; H01J 47/1266; H01J 47/1294
(Continued)

(56) References Cited

U.S. PATENT DOCUMENTS 3,614,437 A     10/1971  Allemand et al.
3,984,691 A *  10/1976  Allemand ............... H01J 47/12
                                                            250/385.1
(Continued)

FOREIGN PATENT DOCUMENTS

DE      2115265      10/1972

OTHER PUBLICATIONS

Author: V. S. Litvin et al., Title: A Position-Sensitive Wire-Strip Thermal- and Cold-Neutron Detector with a Boron Converter, Date: 2011, Publisher: Bulletin of the Russian Academy of Sciences. Physics, 2011, vol. 75, No. 2, pp. 229-231. © Allerton Press, Inc.*
(Continued)

*Primary Examiner* — Taeho Jo
(74) *Attorney, Agent, or Firm* — David C. Purdue

(57) ABSTRACT

The invention relates to a neutron detector unit for neutrons, in particular thermal and cold neutrons, comprising a detector housing (7, 17, 27), cathode elements and a plurality of anode elements (5, 15, 25), wherein in order to form a volume detector unit the anode elements (5, 15, 25) and the
(Continued)

Figure 1:
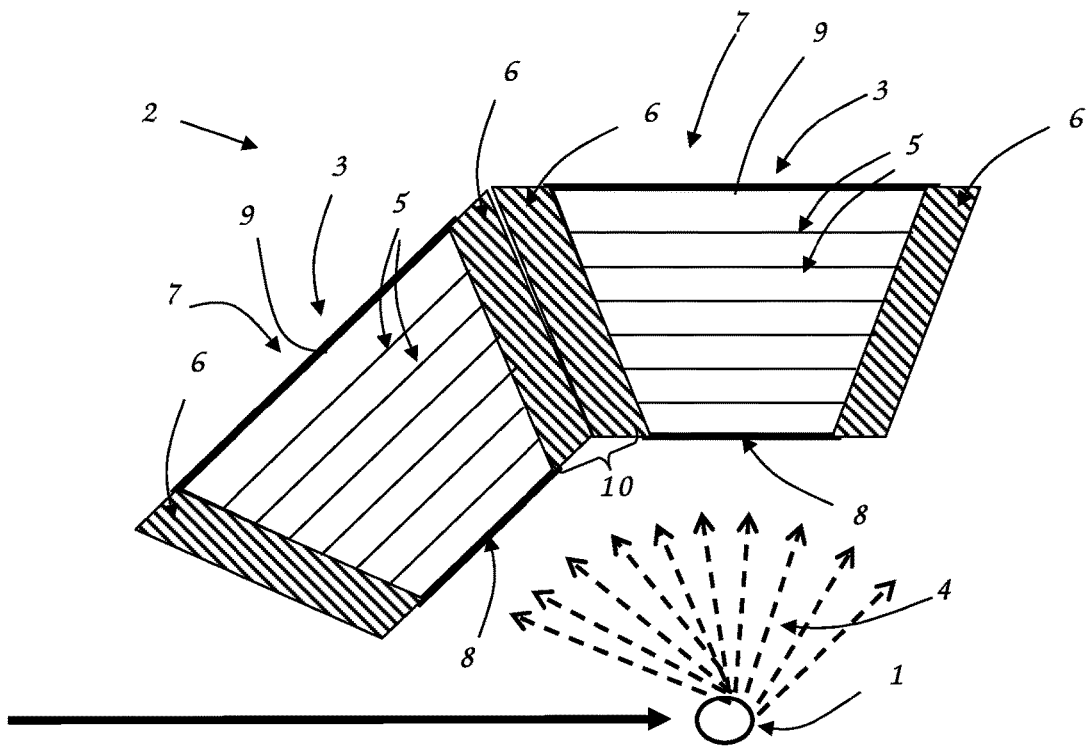

cathode elements enable a three-dimensional spatial resolution for conversion events, characterized by a converter gas in the detector housing (7, 17, 27). According to the invention, in a neutron detector arrangement which includes at least one neutron detector unit the neutron detector unit (3, 13, 23) or at least one of the neutron detector units (3, 13, 23) is oriented in such a way that at least some of the anode elements (5, 15, 25) of the at least one neutron detector unit (3, 13, 23) extend at least predominantly in a longitudinal orientation parallel or almost parallel to the direction of travel of the neutrons (4) to be detected.

31 Claims, 2 Drawing Sheets

(51) Int. Cl.
*H01J 47/12* (2006.01)
*G01T 3/08* (2006.01)

(58) Field of Classification Search
USPC .................................................. 250/385.1
See application file for complete search history.

(56) References Cited

U.S. PATENT DOCUMENTS

| | | | |
|---|---|---|---|
| 4,447,727 A | 5/1984 | Friesenhahn | |
| 5,289,510 A * | 2/1994 | Mihalczo | G01T 1/20 376/253 |
| 6,426,504 B1 | 7/2002 | Menlove et al. | |
| 6,433,340 B1 * | 8/2002 | Penn | G01T 1/20 250/253 |
| 2002/0139935 A1 * | 10/2002 | Klein | H01J 47/1211 250/390.01 |
| 2004/0256967 A1 * | 12/2004 | Downing | H01J 9/125 313/103 R |
| 2005/0205798 A1 * | 9/2005 | Downing | G01T 1/167 250/390.11 |
| 2006/0017000 A1 * | 1/2006 | Martoff | G01T 3/00 250/390.02 |
| 2008/0210880 A1 * | 9/2008 | Baroni | G01N 23/2073 250/390.11 |
| 2008/0283725 A1 * | 11/2008 | Hahn | H01J 47/02 250/207 |
| 2010/0258735 A1 * | 10/2010 | Weissman | G01T 3/008 250/390.01 |
| 2010/0258737 A1 * | 10/2010 | McCormick | H01J 47/1205 250/390.01 |
| 2011/0215251 A1 * | 9/2011 | Guerard | H01J 47/02 250/385.1 |
| 2012/0037812 A1 * | 2/2012 | Norris | G01T 3/00 250/393 |
| 2012/0049054 A1 * | 3/2012 | Zhou | B82Y 15/00 250/265 |
| 2012/0217406 A1 * | 8/2012 | McGregor | G01T 3/008 250/361 R |
| 2012/0280132 A1 * | 11/2012 | Nakamura | G01T 3/06 250/368 |
| 2014/0077092 A1 * | 3/2014 | Kopp | G01T 3/00 250/390.01 |

OTHER PUBLICATIONS

Author:Morris et al., Title: Multi-wire proportionalchamberforultra-coldneutrondetection, Date: 2008, Publisher: Elsevier B.V.*
Seunghee Son et al., Title: Neutron Imaging Camera, Date:2010, Publisher: IEEE.*
M. Henske, et al, "The B based Jablousie neutron detector—An alternative for He filled based sensitive counter tubes", Nuclear Instruments and Method in Physics Research A, May 21, 2012, pp. 151-155, vol. 686.
S.D. Hunter, et al, "Neutron Imaging Camera", SPEI, Apr. 1, 2008, vol. 6954.
J.C. Buffet, et al, "Advances in detectors for single crystal neutron diffraction", Nuclear Instruments & Method in Physics Research, Section A, Dec. 1, 2005, pp. 392-405, v554.
Carina Hoeglund, et al. "BC thin films for neutron detection", JNRL of Applied Physics, American Institute of Physics, May 15, 2012, pp. 104908-1-104908-8, v. III, No. 10.

* cited by examiner

NEUTRON DETECTOR UNIT AND NEUTRON DETECTOR ARRANGEMENT

The invention relates to a neutron detector unit for thermal neutrons and to a neutron detector arrangement.

Since thermal neutrons themselves do not have an ionizing effect, they are, according to commonly known prior art, detected by nuclear reactions with suitable effective cross-sections, in the course of which ionizing particles result. In a counting gas, the ionizing particles serve to generate charge carriers which are captured by means of an electric field and detected. Counting tubes operating according to this principle are well known. In particular, $^{10}$B, $^{6}$Li or $^{3}$He, which are respectively referred to as converter material, are used as suitable materials for the aforementioned nuclear reactions.

The type of converter material employed may, in particular, depend on the availability thereof and/or on the intended purpose of the employed neutron detector. In the past, the gaseous converter material $^{3}$He was preferably used for thermal neutrons when high neutron sensitivity and low sensitivity to gamma radiation were needed. $^{3}$He is chemically inert, therefore largely harmless from a health point of view, and permits a good spatial resolution. However, $^{3}$He was typically operated at pressures of 10 bar and higher. In the prior art, high pressures of a converter gas are sought-after so as to achieve higher probabilities of the conversion results at a given volume and therefore to achieve higher detection probabilities. Such pressures are no problem for proportional counting tubes having usual dimensions, but do lead to mechanical challenges in the case of detectors with larger areas, which challenges can no longer be solved by using arbitrarily thick wall strengths for the detector walls as a result of the increasing impediment to the passage of the neutrons to be detected. However, $^{3}$He is hardly available or expensive for measurements and scientific applications.

$^{10}$BF$_3$ is an alternative gaseous converter for thermal neutrons and significantly cheaper than $^{3}$He. Like $^{3}$He, $^{10}$BF$_3$ serves as ionization gas at the same time, but it is disadvantageous inasmuch as it is poisonous. Furthermore, a deficiency of the current prior art is that $^{10}$BF$_3$ as converter and counting gas can only be operated at pressures up to, at most, approximately 2 bar and therefore leads to lower detection probabilities compared to $^{3}$He in the known detectors.

A solid converter material, which e.g. is employed as a layer material, is used as an alternative to gaseous converter material. DE 32 33 442 A1 has disclosed a large-area factory gate monitor for neutrons, which is constructed using proportional counters. The proportional counter disclosed therein comprises a closed and sealed metal box, the inner wall areas of which are coated with $^{6}$Li enriched metal. A multi-cell proportional counter structure is arranged in the interior of the box filled with a counting gas. An arrangement of such proportional counters can be used for monitoring purposes at a portal, e.g. a factory gate, in order to register neutron emitting substances. The multiplicity of counting wires arranged within the respective box, switched as anodes and arranged in a single plane serve to increase the detection probability. Here, spatial resolution within the proportional counter is not required.

A further large-area detector is known from DE-A 2 115 265, in which a plurality of planar counting elements are arranged in succession between large-area plates with a boron coating containing $^{10}$B. Argon with 10% methane is disclosed as counting gas. The structure providing depth, i.e. the successive arrangement of a plurality of area-like counting elements, serves only to increase the detection probability. A spatial resolution within a detector unit is not disclosed.

DE-A 1 919 824 has disclosed a neutron detector unit which has a plurality of anode strips and cathode strips within the detector housing, which strips may extend parallel to one another or cross one another. Both the anode strips and the cathode strips respectively lie within an area which can be planar or bent in a circular sector shape. The anode and cathode strips respectively form a plurality of readout cells. A spatial resolution within the readout area given by the readout cells is made possible by a coincidence circuit. $^{10}$BF$_3$ or $^{3}$He are disclosed as converter material. The disclosed arrangement therefore only enables a planar spatial resolution. The detection sensitivity is restricted by the small depth of the detector.

A neutron detector and a neutron detector arrangement are known from the article "The $^{10}$B based Jalousie neutron detector—An alternative for $^{3}$He filled position sensitive counter tubes" by M. Henske et al. (Nuclear Instruments and Methods in Physics Research A 686 (2012), 151-155). There, a neutron detector arrangement according to a so-called jalousie concept is disclosed, in which the individual neutron detector units are arranged relative to one another like the slats of a jalousie. The neutron detector units themselves respectively have a detector housing, which is coated with $^{10}$B on the inner side thereof. Moreover, provision is made for anode wires extending parallel to one another in two planes, wherein a plane with cathode strips extending perpendicular to the anode wires and parallel to one another is provided between the anode wire planes. The cathode strips are coated on both sides with $^{10}$B. A mixture of argon and $CO_2$ is disclosed as counting gas. In the overall arrangement, the individual neutron detector units are configured in such a way that the housing walls, and therefore the plane of the cathode strips, have an angle of e.g. 10° in relation to the neutron trajectory.

What this measure achieves is that a neutron passes through a plurality of detector units and e.g. eight boron layers in the process when passing through the detector arrangement, and so a high conversion probability and thus detection probability can be achieved. The anode wires are aligned substantially perpendicular to the neutron trajectory.

By using the neutron detector arrangement according to the jalousie concept, large detector areas can be implemented using the slat-shaped detector units with the same design arranged according to the above-described principle, which detector areas can topologically be rolled onto a plane surface, e.g. large planar or cylinder barrel-shaped detector areas. To the extent that a spatial angle which is as complete as possible is to be covered for implementing a 4π-detector, the end faces should likewise be closed off using detector units. When a plane surface is used in each case at the end faces, these must be set up at a greater distance from the scattering center than the radius of the cylinder barrel. However, the end faces can also be closed off in each case by a further partial cylinder barrel surface; however, the latter then needs to have a radius greater by a factor of $\sqrt{2}$ for geometric reasons. In order to keep the detector area to a smaller size, it would be necessary to build up the end faces from many detector units to be manufactured individually, which have different sizes.

It now is an object of the present invention to provide a neutron detector unit and a neutron detector arrangement which enable improved volume detection, i.e. a neutron detection with a spatial resolution of the conversion events in three dimensions.

In a neutron detector unit of the type set forth at the outset, this object is achieved by virtue of a converter gas being used in the detector housing. The converter gas can be a single gas or gas mixture, wherein a component not acting as a converter material may also be contained in the gas mixture.

By using a converter gas, it is first of all possible to dispense with the complicated coating of the housing walls or electrode elements. As a result, the concept of achieving a high detection probability by combining a volume detector with a converter gas is pursued for the first time. In particular, it is possible to use the gaseous converter gas, which—as single gas or gas mixture—simultaneously serves as counting gas, at low pressures, in particular pressures of up to 1.5 bar. Lower pressures may also be advantageous, e.g. 1.1 bar or normal pressure and, in particular, those pressures which only slightly deviate from the pressure of the atmosphere surrounding the detector unit. This enables the construction of large detector units which, in principle, can be built to any desired depth, as a result of which the detection probability for thermal neutrons can be brought to approaching 1.

Preferably, the neutron detector unit is embodied in such a way that the detector housing has a depth provided for the neutron trajectory which leads to a detection probability of at least 50% for a given type and given pressure of the converter gas and a given wavelength range of the neutrons to be detected. Detection probabilities of at least 60%, more preferably at least 70%, at least 80% or at least 90% are more preferable.

A further advantage of the use of a pressure of the converter gas that only deviates slightly from the surrounding atmospheric pressure lies in the possibility of being able to construct thin housing walls and, in particular, the housing wall facing a scattering probe or neutron source, i.e. the neutron entry window. A reduced wall thickness of the entry window constitutes a smaller impediment to the entry of neutrons, with correspondingly reduced neutron absorption or neutron scattering in the wall material.

The measurement in the volume detector with a suitable measurement depth furthermore offers the advantage of being able to deduce a mean trajectory of the detected neutrons from a plurality of detected conversion events. The track emerging from the sequence of conversion events can therefore permit conclusions to be drawn as to whether the detected neutrons originate directly from the provided source, e.g. a scattering probe, or from e.g. a foreign source or from scattering at device elements, e.g. a detector housing wall.

By using the volume detector unit according to the invention, neutron conversions can be detected spatially in all three spatial directions and in a temporally defined manner. As a result of measuring into the depth, parallax problems can be avoided. The increased number of readout channels required for a volume detector completely complies with the modern requirements of rate-suitability of modern neutron detectors, as are required in modern neutron spallation sources.

A gas or gas mixture can be used as gaseous converter material, which comprises at least one of the following isotopes: $^3$Helium, $^6$Lithium, $^{10}$Boron, $^{155}$Gadolinium, $^{157}$Gadolinium and/or $^{235}$Uranium.

Preferably, $^{10}BF_3$ or a gas mixture containing $^{10}BF_3$ is used as gaseous converter material. This converter material is very well suited to, in particular, the use at pressures of up to 1.5 bar and readily available.

The use of a gaseous converter material does not preclude the additional use of a solid converter material, e.g. in the form of layers, e.g. on the inner side of the outer walls, in intermediate walls or on electrodes, in particular the cathode elements. As a result of this, the detection probability can be further increased.

The neutron detector unit according to the invention can have such a design that a multiplicity of readout cells, which are distributed in the detector housing in three dimensions, emerge. This realizes a volume detector. A multiplicity within the meaning of the invention is synonymous with more than 10. A plurality means at least two. For a volume detection that is as efficient as possible, a significantly higher number of the readout cells than 10 is advantageous, e.g. at least 30 or at least 50.

The definition of a readout cell depends on the type of spatial determination of conversion events. The spatial determination can be performed by, for example, determining coincidence of signals of different electrodes not extending parallel to one another. In this case, the readout cells are given by the crossing points of the electrodes. These can be crossing points between two anode elements projected in the neutron trajectory or else crossing points between an anode element and a cathode element, e.g. embodied in a wire or strip-shaped manner, projected in the neutron trajectory.

As an alternative to the coincidence measurement, the location of the event can also be established by charge splitting of the signals at both ends of an anode element serving as counting wire or by determining the signal propagation times. In this case, the readout cells are no longer discrete but merge into one another continuously along the anode element.

When determining the location of the conversion event, the distribution and alignment of the anode elements are decisive for the volume detection. Here, in the ideal case, the cathode elements should be shaped and arranged in such a way that they generate at least similarly strong electrostatic fields at as many anode elements as possible. The cathode elements can be embodied in a self-supporting manner and e.g. extend between the anode elements, for example in a strip-shaped manner or in cathode planes with planar extent, or surround the anode elements, for example in a three-dimensional honeycomb-like structure, similar to a honeycomb, wherein one anode element is passed through each honeycomb element.

The neutron detector unit according to the invention can also be embodied in such a way that the detector housing is delimited by a plurality of outer wall elements, wherein at least one wall element provided for the entry of the neutrons to be detected is kept free from means for the electrical lead-through for anode elements and/or cathode elements.

The wall element kept free in such a way impedes the neutron trajectory to significantly smaller extent, can be embodied in a manner taking up less space and faces a neutron source or a scattering probe during use as a neutron entry window.

In particular, it can be advantageous if the neutron entry window is kept free from means for electrical insulation, from means for electric and/or electronic contacting and/or from means for affixing anode elements and/or cathode elements.

Moreover, it can be advantageous if at least one sidewall element adjoining a wall element provided for the entry of the neutrons to be detected is kept free from means for the electrical lead-through for anode elements and/or cathode elements. Preferably, such a sidewall element can be kept free from means for electrical insulation, from means for electric and/or electronic contacting and/or from means for affixing anode elements and/or cathode elements.

If relevant sidewall elements, the areas of which generally include an acute angle with, or extend parallel to, the expected neutron trajectory, are largely free from elements interfering with the neutron trajectory, it is possible to build a detector arrangement that is virtually free of blind areas.

Here, in particular, it can be advantageous if the means for fixation, electrical insulation, lead through and/or electric or electronic contacting of anode elements are arranged on a rear wall element lying opposite to the entry window. In this case, the anode elements can be aligned parallel or virtually parallel to the trajectory of the neutrons.

Here, it can be furthermore advantageous if at least some of the anode elements extend in a U-shaped manner. Thus, it is possible e.g. to provide the signal lead through, voltage supply and/or fixation for both ends of the relevant anode element on the same wall element.

For clarification purposes, it is noted at this juncture that different wall elements can be delimited from one another by corner angles or else can merge continuously into one another without an angle. In the latter case, a wall element is characterized by its function, e.g. as entry window for the neutrons or as a region of the lead through of electric connectors, or its spatial alignment, e.g. a front, lateral, upper, lower or rear wall element in relation to the neutron trajectory.

However, the means for fixation, electrical insulation, lead through and/or electric or electronic contacting of anode elements can also be provided in each case at different, e.g. opposing, wall elements.

Anode elements generally have a very thin embodiment in order to ensure high field strength of the electrostatic field and therefore suitable amplification of the conversion event in the counting gas. Therefore, anode elements are generally wire-shaped; more complex, e.g. strip-shaped structures are possible in the case of appropriate microstructuring. Such thin structures are not self-supporting and must therefore be mechanically supported or tensioned. The support or tensioning can be brought about by the wall elements themselves. Here, the wall elements can simultaneously serve for fixation purposes. However, it is also possible, for the purposes of supporting or tensioning the anode elements, to provide special holding structures extending into the detector unit, preferably those that do not interfere with the neutron path or only interfere unsubstantially therewith.

A neutron detector arrangement for detecting neutrons, in particular thermal or cold neutrons, which comprises one or more of the neutron detector units according to the invention, likewise meets the aforementioned technical object.

A neutron detector arrangement can consist of a single neutron detector unit or of a plurality thereof. In this embodiment of the invention, the alignment of the electrodes within the neutron detector arrangement, in particular of the anodes, relative to the trajectory of the neutrons to be detected and therefore relative to a scattering probe or any other neutron source is essential. At least some of the anode elements extend, at least predominantly in the longitudinal direction thereof, parallel or almost parallel to the trajectory of the neutrons to be detected.

"Almost parallel" means a possible deviation of the trajectory of the neutrons to be detected from the direction of extent of the anode element of at most 30°, preferably of less than 15°. That the anode elements predominantly have the required extent in the longitudinal direction thereof means that this profile applies to more than 50%, preferably to more than 75% of the length of the anode element within the corresponding neutron detector unit.

The trajectory of the neutrons to be detected relative to the detector arrangement is determined by the alignment of the neutron detector arrangement in relation to the decisive source of neutrons, e.g. a scattering probe.

Aligning the anode elements parallel or almost parallel to the trajectory of the neutrons to be detected has various substantial advantages. If the anode elements are built with a suitably long length and if sufficiently many conversion options are provided to the neutrons on the trajectories thereof along the anode elements, it is possible, in principle, to achieve an arbitrary high detection probability.

The conversion option can be provided by solid converter material which must be offered at suitable distances within the at least one neutron detector element, e.g. by converter material layers applied to cathode elements.

However, a particularly advantageous combination effect emerges by the use of a converter gas which, for example, contains $^{10}BF_3$. As a result of using such a converter gas—complemented, where required, by further trace gases such as e.g. $CO_2$—at e.g. atmospheric pressure, the at least one neutron detector unit can be built to be large where necessary such that the anode elements can be embodied correspondingly long, e.g. in the region of 2 to 5 absorption lengths of the neutrons. The pressure of the converter gas may also be lower than atmospheric pressure, e.g. for matching a correspondingly low pressure in the surroundings of the measurement, or else exceed the latter and e.g. be up to at most 1.5 bar or, more preferably, less than 1.1 bar. The use of the parallel or almost parallel alignment of the anode elements is optimized when using the converter gas.

Furthermore, the alignment of the anode elements parallel or almost parallel to the trajectory of the neutrons renders it possible to build the neutron detector arrangement without blind areas. If the neutron detector arrangement is assembled from a single neutron detector unit, it is possible to completely dispense with interfering intermediate walls extending parallel to the trajectory of the neutrons. It is advantageous to provide possibly present intermediate walls, and also sidewalls, at an angle to the trajectory of the neutrons in order to avoid movement of individual neutrons within this wall only, i.e. without, or with only a brief, entry into the interior of a neutron detector unit. For the same reason, such an angled position of the intermediate walls, or else of the sidewalls, within a neutron detector arrangement is also advantageous for the case where the anode elements are not aligned at least predominantly parallel or virtually parallel to the neutron trajectory. By way of example, the angle between the plane of the wall and the neutron trajectory can be 5° to 45°, preferably 5° to 20°.

Moreover, it is possible to embody and align the at least one neutron detector unit of the neutron detector arrangement in such a way that interfering elements, in particular the signal lead throughs for the anode elements, are in each case provided only at a rear wall element or wall region of the corresponding detector housing that faces away from the neutron source or the scattering probe and therefore lies opposite to a neutron entry window. Expressed mathematically, the geometric arrangement is such that the outward surface normal of the rear wall element forms a positive scalar product with the direction vector of the neutron radiation. Hence, the front wall element of the respective detector housing, which faces the scattering probe or the neutron source and comprises the neutron entry window, can be kept free from elements interfering with the entry of the neutrons into the detector housing, e.g. free from electrical lead throughs or connectors for the signal readout. In the case of a coincidence measurement, one end of the anode element can project into the detector space. For a signal propagation measurement or for a charge splitting measurement, provision can be made for a directional change, preferably with a U-shaped profile, for the anode element.

The neutron detector units according to the invention are virtually free in terms of their outer shape, which is why the whole neutron detector arrangement can consist of a single neutron detector unit or an assembly of a plurality of neutron detector units.

Large neutron entry areas for the neutron detector arrangement can be implemented; these can cover any solid angle, including the complete solid angle of $4\pi$. The neutron entry area is formed by the front wall of the neutron detector unit facing the scattering probe or the totality of front walls in the case of a plurality of neutron detector units. The neutron entry area specifies the detector area which, ideally, is spherical or approximately spherical, but also may have the form of a cylinder barrel. The detector area can also be enlarged by covering the cylinder end faces, which can conveniently be achieved using the neutron detector units according to the invention. Here, an alignment of the anode elements parallel or almost parallel to the trajectory of the neutrons is not necessary but particularly advantageous.

The neutron detector units can also be embodied corresponding to the slats in accordance with the neutron detector arrangement according to the jalousie principle, as illustrated in the introductory part of the description.

In the following, advantageous embodiments of the neutron detector unit according to the invention and of the neutron detector arrangement according to the invention are illustrated on the basis of figures.

Figure 2:
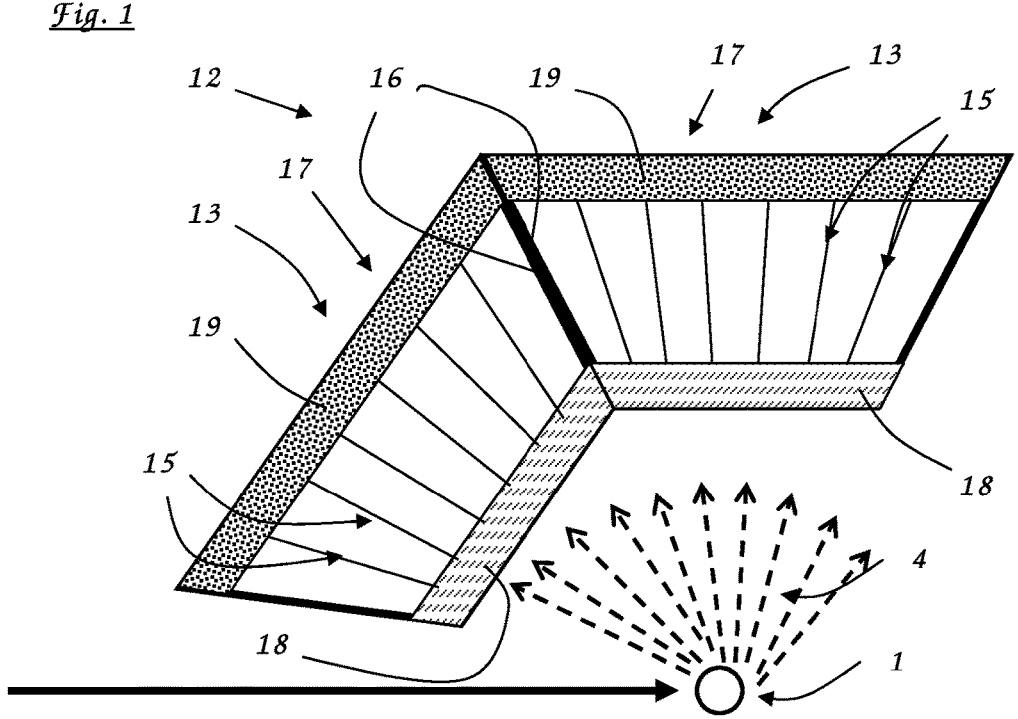
Figure 3:
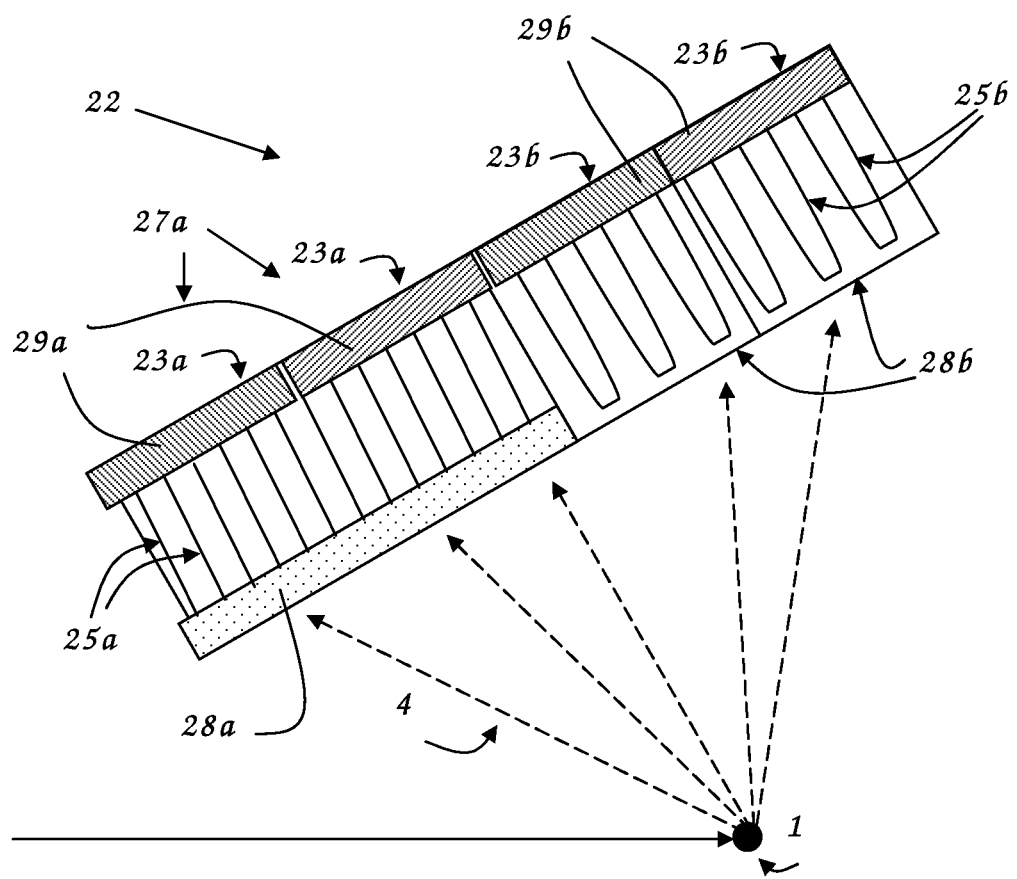

In a schematic illustration:

FIG. 1 shows a neutron detector arrangement comprising two neutron detector units with anode wires tensioned substantially perpendicular to the neutron trajectory, FIG. 2 shows a neutron detector arrangement comprising two neutron detector units with anode wires tensioned substantially parallel to the neutron trajectory and FIG. 3 shows a neutron detector arrangement with anode wires tensioned substantially parallel to the neutron trajectory and in two different ways.

FIG. 1 shows, in sections, a neutron detector arrangement 2 built around a scattering probe 1 for neutrons 4, which neutron detector arrangement should in fact surround a larger solid angle around the scattering probe 1. The bold arrow shows the direction from which the scattering probe 1 is bombarded with neutrons 4.

Two neutron detector units 3 are shown in relation to the neutron detector arrangement 2 and have anode wires 5, which are arranged substantially perpendicular to the trajectory of neutrons 4 to be detected and tensioned between the sidewalls 6 of the respective detector housing 7 of the neutron detector units 3. More than two neutron detector units 3 can be provided for covering a larger solid angle.

Here, six of the anode wires 5 can be seen in an exemplary manner along the neutron trajectory between a front wall 8 and a rear wall 9 of the associated detector housing 7. The arrangement of the anode wires therefore enables a measurement into the depth substantially corresponding to the neutron trajectory. The space extending perpendicular to the plane of the drawing is likewise provided with a multiplicity of anode wires 5 (not visible in FIG. 1) such that, overall, a volume detector which enables the determination of the position and time of conversion events in the three-dimensional space is implemented by the neutron detector units 3.

The neutron detector units 3 are filled with a converter gas, e.g. $^{10}BF_3$. In the case of the converter gas pressure deviating e.g. only slightly from the ambient pressure, the neutron detector units 3 can be built to arbitrary depth in the neutron trajectory and therefore with correspondingly many anode wires 5 arranged in succession in the trajectory of the neutrons 4 such that a correspondingly arbitrarily high detection probability can be reached.

However, the neutron detector arrangement 2 according to FIG. 1 has one disadvantage: two sidewalls 6 of the neutron detector units 3 abut on one another and therefore generate a blind area 10 with a blind volume, in which a neutron conversion cannot be detected, in the subsequent neutron trajectory.

By contrast, FIG. 2 shows, in sections, a neutron detector arrangement 12, in which two exemplary neutron detector units 13 are embodied in such a way that the anode wires 15 are aligned parallel or almost parallel to the trajectory of the neutrons 4 and tensioned between front wall 18 and the rear wall 19 of the respective detector housing 17. The front walls 18 of the neutron detector units 13 facing the scattering probe 1 can be built to be transparent to neutrons. Using this arrangement, a substantially blind area-free structure of the neutron detector arrangement 12 is possible since the anode wires 15 can be built near sidewalls 16, which can have a thin embodiment. In order to further reduce or else completely eliminate blind areas, the sidewalls 16 can be placed at an angle to the neutron trajectory such that the wall areas include an angle of e.g. 15° with the neutron trajectory. Furthermore, it is possible to implement the neutron detector arrangement 12 with only a single neutron detector unit 13 without intermediate walls. This also applies to alternative embodiments, e.g. according to FIG. 3.

FIG. 3 finally schematically shows a neutron detector arrangement 22 for detecting neutrons 4 scattered at the scattering probe 1, which has two different types of neutron detector units 23a and 23b. Two neutron detector units 23a have anode wires 25a which are substantially parallel to the trajectory of the neutrons 4 and, like in FIG. 2, tensioned between a front wall 28a and a rear wall 29a of the respective housing 27a of the neutron detector units 23a. The front wall 28a is configured to be transparent to neutrons and therefore forms a neutron entry window. However, the lead throughs (not depicted here) for the anode wires 25a at the front side 28a form interference points for the neutrons 4, in particular also as a result of the necessary insulation material.

Two neutron detector units 23b have anode wires 25b, for which the lead throughs (likewise not depicted here) are merely provided at the rear walls 29b of the neutron detector units 23b. The respective front wall 28b can therefore be designed to be free from interference points for the neutrons 4. For a stable arrangement of the anode wires 25b, these must either be affixed with a little interfering material at the front wall 28b or the sidewalls in an insulated manner or be tensioned using holding devices (not depicted here) which project into the neutron detector units 23b, but which can be configured in such a way that they have no substantial disadvantageous influence on the neutron path and the neutron detection probability.

For the sake of improved clarity, no cathode elements have been plotted in the interior of the respective neutron detector units 3, 13 and 23a or 23b in any of FIGS. 1 to 3. Cathode elements are in each case formed by the wall elements of the respective detector housing and by suitable structures (not depicted here), which project into the neutron detector units and are configured to provide suitable electrostatic fields to the anode wires.

LIST OF REFERENCE SIGNS

1 Scattering probe
2 Neutron detector arrangement
3 Neutron detector unit
4 Neutrons
5 Anode wires
6 Sidewalls
7 Detector housing
8 Front wall
9 Rear wall
10 Blind area
12 Neutron detector arrangement
13 Neutron detector unit
15 Anode wires
16 Sidewalls
17 Detector housing
18 Front wall
19 Rear wall
22 Neutron detector arrangement
23 Neutron detector unit
25 Anode wires
26 Sidewalls
27 Detector housing
28 Front wall
29 Rear wall

The invention claimed is:

1. A neutron detector unit for thermal and cold neutrons, comprising
a detector housing (7, 17, 27),
cathode elements,
a plurality of wire-shaped anode elements (5, 15, 25), and
a converter gas in said detector housing (7, 17, 27),
wherein said neutron detector unit is a volume detector unit, in which a plurality of detector readout cells distributed three-dimensionally in the detector housing (7, 17, 27) are formed by at least some of said anode elements (5, 15, 25), or by at least some of said anode elements (5, 15, 25) and at least some of said cathode elements for the purposes of determining the position of conversion events,
wherein said neutron detector unit is configured for determining the position by coincidence measurement, charge splitting or determining signal propagation times, and
wherein the pressure of the converter gas in the detector housing is at or below a normal pressure.

2. The neutron detector unit as claimed in claim 1, wherein said converter gas contains at least one of the following isotopes: $^3$He, $^6$Li, $^{155}$Gd, $^{157}$Gd and/or $^{235}$U.

3. The neutron detector unit as claimed in claim 2, wherein said converter gas is $^{10}$BF$_3$.

4. The neutron detector unit as claimed in claim 2, wherein said converter gas is $^3$He.

5. The neutron detector unit as claimed in claim 1, further comprising a solid-state converter.

6. The neutron detector unit as claimed in claim 1, wherein said detector readout cells distributed three-dimensionally are arranged in at least two readout areas lying in succession in the direction of the surface normals thereof.

7. The neutron detector unit as claimed in claim 1, further comprising a plurality of wall elements (8, 18, 28) provided for the entry of the neutrons to be detected, wherein said detector housing (7, 17, 27) is delimited by said plurality of said wall elements (8, 18, 28), and wherein at least one of said wall elements (8, 18, 28) is kept free from means for the electrical lead-through for said anode elements (5, 15, 25), for said cathode elements, or for said anode elements (5, 15, 25) and said cathode elements.

8. The neutron detector unit as claimed in claim 7 wherein at least one of said wall elements (8, 18, 28) provided for the entry of the neutrons to be detected is kept free from means for electrical insulation, from means for electric contacting, from means for electronic contacting, from means for affixing said anode elements, or from means for affixing said cathode elements.

9. The neutron detector unit as claimed in claim 7 wherein at least some of said anode elements (5, 15, 25) in each case extend in a U-shaped manner.

10. The neutron detector unit as claimed in claim 9, wherein said detector housing (7, 17, 27) has a depth provided for the neutron trajectory which leads to a detection probability of at least 50% for a given type and given pressure of the converter gas and a given wavelength range of the neutrons to be detected.

11. The neutron detector unit as claimed in claim 1, further comprising at least one sidewall element (16) adjoining a wall element (8, 18, 28) provided for the entry of the neutrons to be detected, wherein said at least one sidewall element (16) is kept free from means for the electrical lead-through for said anode elements (5, 15, 25), for said cathode elements, or for said anode elements (5, 15, 25) and said cathode elements.

12. The neutron detector unit as claimed in claim 11, wherein at least one of said sidewall elements (16) is kept free from means for electrical insulation, from means for electric contacting, from means for electronic contacting, from means for affixing said anode elements, or from means for affixing said cathode elements.

13. The neutron detector unit as claimed in claim 11 wherein at least some of said anode elements (5, 15, 25) in each case extend in a U-shaped manner.

14. The neutron detector unit as claimed in claim 13, wherein said detector housing (7, 17, 27) has a depth provided for the neutron trajectory which leads to a detection probability of at least 50% for a given type and given pressure of the converter gas and a given wavelength range of the neutrons to be detected.

15. The neutron detector unit as claimed in claim 1 wherein at least some of said anode elements (5, 15, 25) in each case extend in a U-shaped manner.

16. The neutron detector unit as claimed in claim 1 wherein said detector housing (7, 17, 27) has a depth provided for the neutron trajectory which leads to a detection probability of at least 50% for a given type and given pressure of the converter gas and a given wavelength range of the neutrons to be detected.

17. The neutron detector unit as claimed in claim 15, wherein said detector housing (7, 17, 27) has a depth provided for the neutron trajectory which leads to a detection probability of at least 50% for a given type and given pressure of the converter gas and a given wavelength range of the neutrons to be detected.

18. A neutron detector arrangement for thermal and cold neutrons, said neutron detector arrangement comprising at least one neutron detector unit (3, 13, 23) as claimed in claim 1.

19. The neutron detector arrangement as claimed in claim 18, said neutron detector arrangement comprising at least one neutron detector unit (3, 13, 23) as claimed in claim 7.

20. The neutron detector arrangement as claimed in claim 18, said neutron detector arrangement comprising at least one neutron detector unit (3, 13, 23) as claimed in claim 9.

21. The neutron detector arrangement as claimed in claim 18, said neutron detector arrangement comprising at least one neutron detector unit (3, 13, 23) as claimed in claim 10.

22. A neutron detector arrangement for thermal and cold neutrons comprising at least one neutron detector unit (3, 13, 23) embodied as a volume detector unit, wherein each one of said at least one neutron detector units (3, 13, 23) has a detector housing (7, 17, 27), cathode elements and a plurality of wire-shaped anode elements (5, 15, 25) and wherein a plurality of detector readout cells distributed three-dimensionally in the detector housing (7, 17, 27) are formed, in the at least one neutron detector unit (3, 13, 23), by at least some of said anode elements (5, 15, 25) or by at least some of said anode elements (5, 15, 25) and at least some of said cathode elements for the purposes of determining the position of conversion events, and said neutron detector unit (3, 13, 23) is configured for determining the location by coincidence measurement, charge splitting or determining signal propagation times, wherein said neutron detector unit (3, 13, 23) or at least one of said neutron detector units (3, 13, 23) is aligned in such a way that, in the longitudinal direction thereof, at least some of said anode elements (5, 15, 25) of said at least one neutron detector unit (3, 13, 23) extend, at least predominantly, parallel or almost parallel to the trajectory of the neutrons (4) to be detected.

23. The neutron detector arrangement as claimed in claim 22, wherein at least one of said neutron detector units (3, 13, 23) is a neutron detector unit as claimed in claim 1.

24. The neutron detector arrangement as claimed in claim 22, wherein at least one of said neutron detector units (3, 13, 23) is a neutron detector unit as claimed in claim 7.

25. A neutron detector arrangement as claimed in claim 22, wherein at least one of said neutron detector units (3, 13, 23) is a neutron detector unit as claimed in claim 9.

26. A neutron detector arrangement as claimed in claim 22, wherein at least one of said neutron detector units (3, 13, 23) is a neutron detector unit as claimed in claim 10.

27. The neutron detector arrangement as claimed in claim 22, further comprising a curved neutron entry area.

28. The neutron detector arrangement as claimed in claim 22, further comprising a neutron entry area that is spherical.

29. The neutron detector arrangement as claimed in claim 22, further comprising a neutron entry area that is cylinder barrel-shaped.

30. The neutron detector arrangement as claimed in claim 22, further comprising a neutron entry area that is cylindrical.

31. The neutron detector arrangement as claimed in claim 22, further comprising a scattering probe (1) and an entry opening for neutrons (4) not yet scattered by said scattering probe (1).

* * * * *